United States Patent
Shon et al.

(10) Patent No.: US 9,620,785 B2
(45) Date of Patent: Apr. 11, 2017

(54) CARBON STRUCTURE ELECTRODE FOR REDOX FLOW BATTERY, METHOD OF PREPARING CARBON STRUCTURE ELECTRODE FOR REDOX FLOW BATTERY, AND CARBON STRUCTURE ELECTRODE STRUCTURE FOR REDOX FLOW BATTERY

(71) Applicant: OCI COMPANY LTD., Seoul (KR)

(72) Inventors: Jong-Hwa Shon, Seongnam-si (KR); Byung-Chul Kim, Seongnam-si (KR); Soo-Whan Kim, Seongnam-si (KR)

(73) Assignee: OCI COMPANY LTD., Seoul (KR)

(*) Notice: Subject to any disclaimer, the term of this patent is extended or adjusted under 35 U.S.C. 154(b) by 82 days.

(21) Appl. No.: 14/522,068

(22) Filed: Oct. 23, 2014

(65) Prior Publication Data
US 2015/0118550 A1    Apr. 30, 2015

(30) Foreign Application Priority Data
Oct. 25, 2013    (KR) .................. 10-2013-0127714

(51) Int. Cl.
| | | |
|---|---|---|
| H01M 4/00 | (2006.01) |
| H01M 4/86 | (2006.01) |
| H01M 4/04 | (2006.01) |
| H01M 4/88 | (2006.01) |
| H01M 4/96 | (2006.01) |
| H01M 8/18 | (2006.01) |

(52) U.S. Cl.
CPC .......... *H01M 4/8631* (2013.01); *H01M 4/04* (2013.01); *H01M 4/0471* (2013.01); *H01M 4/8875* (2013.01); *H01M 4/96* (2013.01); *H01M 8/188* (2013.01); *H01M 2004/8694* (2013.01)

(58) Field of Classification Search
CPC .......... H01M 2004/8694; H01M 4/04; H01M 4/0471; H01M 4/8631; H01M 4/8875; H01M 4/96; H01M 8/188
See application file for complete search history.

(56) References Cited

U.S. PATENT DOCUMENTS

| | | | | |
|---|---|---|---|---|
| 2005/0260473 A1* | 11/2005 | Wang | ................ | B82Y 30/00 |
| | | | | 429/492 |
| 2009/0136808 A1* | 5/2009 | Kang | ................ | B01J 21/18 |
| | | | | 429/532 |

(Continued)

FOREIGN PATENT DOCUMENTS

| | | |
|---|---|---|
| EP | 1207572 A1 | 11/2000 |
| EP | 2065340 A1 | 11/2008 |
| WO | 2007137794 A1 | 12/2007 |

OTHER PUBLICATIONS

Extended European Search Report dated Mar. 30, 2015.

Primary Examiner — Patrick Ryan
Assistant Examiner — Ben Lewis
(74) Attorney, Agent, or Firm — Hauptman Ham, LLP

(57) ABSTRACT

Disclosed is a carbon structure electrode for redox flow batteries, which includes a plurality of spherical macropores formed on a surface of a polymer-derived carbon structure and inside the polymer-derived carbon structure so as to allow electrolyte migration. The carbon structure electrode for redox flow batteries has excellent electrical conductivity and enables cost reduction through a simplified preparation process.

15 Claims, 3 Drawing Sheets

(56) References Cited

U.S. PATENT DOCUMENTS

| | | | |
|---|---|---|---|
| 2009/0280411 A1* | 11/2009 | Ohira | H01M 4/131 429/221 |
| 2010/0155006 A1* | 6/2010 | Ales | D04H 1/4242 162/149 |
| 2012/0251886 A1* | 10/2012 | Yushin | H01M 4/0402 429/231.5 |
| 2012/0300364 A1 | 11/2012 | Cai et al. | |
| 2013/0105386 A1* | 5/2013 | Deville | B01J 21/066 210/510.1 |

* cited by examiner (a)

(b)

(c)

CARBON STRUCTURE ELECTRODE FOR REDOX FLOW BATTERY, METHOD OF PREPARING CARBON STRUCTURE ELECTRODE FOR REDOX FLOW BATTERY, AND CARBON STRUCTURE ELECTRODE STRUCTURE FOR REDOX FLOW BATTERY

CROSS REFERENCE TO RELATED APPLICATION

This application claims the benefit of Korean Patent Application No. 10-2013-0127714, filed on Oct. 25, 2013, entitled "CARBON STRUCTURE ELECTRODE FOR REDOX FLOW BATTERY, METHOD OF PREPARING CARBON STRUCTURE ELECTRODE FOR REDOX FLOW BATTERY, AND CARBON STRUCTURE ELECTRODE STRUCTURE FOR REDOX FLOW BATTERY", which is hereby incorporated by reference in its entirety into this application.

BACKGROUND

1. Technical Field

The present invention relates to a carbon structure electrode for redox flow batteries, a method of preparing a carbon structure electrode for redox flow batteries, and a carbon structure electrode structure for redox flow batteries.

2. Description of the Related Art

A redox flow battery is a type of secondary battery capable of being repeatedly charged and discharged and is an electrochemical electricity storage device which stores electrical energy. The principle of a redox flow battery is based on fluid electrolytes that generate electrical current through exchange of charges while flowing between porous carbon felt electrodes.

A typical carbon felt electrode for redox flow batteries is prepared by forming polyacrylonitrile (PAN), rayon or pitch-based carbon fiber structure, followed by carbonization and graphitization. However, such a carbon felt electrode for redox flow batteries has drawbacks in that flow of fluid is lowered and polarization of electrolytes occurs due to non-uniform dispersion of pores in the carbon felt electrodes, thereby causing deterioration in battery efficiency.

BRIEF SUMMARY

One embodiment of the present invention provides a carbon structure electrode for redox flow batteries, which has improved electrical conductivity.

Another embodiment of the present invention provides a method of preparing a carbon structure electrode for redox flow batteries, which can simplify manufacturing processes of cells and stacks.

Another embodiment of the present invention provides an electrode structure for redox flow batteries prepared using the carbon structure electrode for redox flow batteries.

According to one embodiment of the invention, a carbon structure electrode for redox flow batteries includes a plurality of spherical macropores formed on a surface of a polymer-derived carbon structure and inside the polymer-derived carbon structure so as to allow electrolyte migration.

The macropores may be stacked in a closest packing structure.

The macropores may be arranged in an opal structure.

The macropores may have an average maximum diameter from about 0.5 μm to about 500 μm.

The macropores may be connected to one another to communicate from one side to the other side of the electrode.

The carbon structure may include a carbide of a polymer resin.

The carbon structure may include a graphitized material of a polymer resin.

The polymer resin may include one selected from the group consisting of a polyacrylonitrile, a polymer for photoresist, a rayon-based polymer, and combinations thereof.

The carbon structure may have a macropore-related porosity of about 70% to about 99%.

The carbon structure may have a thickness of 0.5 mm to 5.0 mm.

The carbon structure may have a resistance of 0.002 Ω·mm to 0.02 Ω·mm.

According to another embodiment of the invention, a method of preparing a carbon structure electrode for redox flow batteries includes: preparing a polymer sheet; forming patterned macropores in the polymer sheet; and carbonizing the polymer sheet having the patterned macropores by heat treatment to form a carbon structure.

The step of forming the patterned macropores may be performed by at least one selected from a laser patterning method, a holographic lithography method using a laser, and a laser lithography method.

At least part of the polymer sheet may be graphitized upon carbonization through heat treatment of the polymer sheet.

The polymer sheet may include one selected from a polyacrylonitrile, a polymer for photoresist, a rayon based polymers, and combinations thereof.

The heat treatment may be performed at 1000° C. to 2500° C.

According to yet another embodiment of the invention, a carbon structure electrode structure for redox flow batteries includes: a bipolar plate; and a carbon structure electrode for redox flow batteries coupled to the bipolar plate.

According to the present invention, the carbon structure electrode for redox flow batteries has patterned pores, that is, a uniformly dispersed pore structure, thereby exhibiting excellent electrical conductivity. In addition, the carbon structure electrode has patterned pores of its own, which enables omission of a compressing process to maximize electrical conductivity during a manufacturing process of the electrode. Accordingly, the preparation process of the electrode can be simplified, thereby reducing manufacturing costs.

Furthermore, the carbon structure electrode for redox flow batteries has three-dimensional patterned pores uniformly dispersed, whereby the flow of fluid can be smoothly conducted to suppress polarization of electrolytes, thereby improving efficiency of a redox flow battery.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
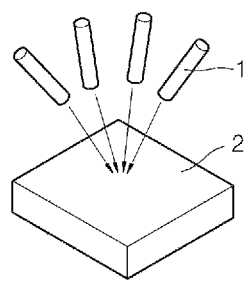
FIG. 1 is a schematic diagram illustrating a process of forming patterned pores in a method of preparing a carbon structure electrode for redox flow batteries according to one embodiment of the present invention.
Figure 1:
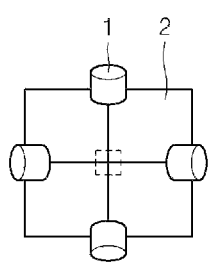
Figure 1:
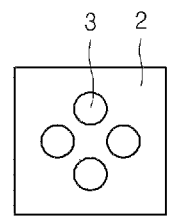

Embodiments of the present invention will now be described in detail with reference to the accompanying drawings. It should be understood that the following embodiments are provided for illustration only and are not to be construed in any way as limiting the present invention. Therefore, the scope of the invention should be limited only by the accompanying claims and equivalents thereof.

One embodiment of the present invention, a carbon structure electrode for redox flow batteries includes a plurality of spherical macropores formed on a surface of a polymer-derived carbon structure and inside the polymer-derived carbon structure so as to allow electrolyte migration The carbon structure electrode for redox flow batteries has patterned pores which are uniformly dispersed, thereby improving electrical conductivity. Accordingly, there is no need for an additional process, for example, a compression process to improve electrical conductivity of the carbon structure electrode in the preparation method, thereby simplifying the manufacturing process of cells and stacks.

Furthermore, the carbon structure electrode for redox flow batteries has three-dimensional patterned pores which are uniformly dispersed, which enables omission of a compressing process to maximize electrical conductivity during a manufacturing process of the electrode, thereby improving efficiency of a redox flow battery.

Properties of the carbon structure electrode for redox flow batteries can be regulated by adjusting the shape and the pattern of the macropores in various ways.

That is, since the properties of the carbon structure electrode for redox flow batteries according to one embodiment of the present invention can be regulated by adjusting the shape of the macropores and a space between the macropores in the preparation process, the carbon structure electrode for redox flow batteries according to one embodiment of the present invention can be well contrasted with typical electrodes wherein carbon felts are used as an electrode material and thus regulation of macropores is almost impossible. The size of the macropores formed in the carbon structure electrode is within a tolerance range of about ±20% relative to an average size of the macropores.

The pattern of macropores may have a stack structure in which spherical pores having a regular size are stacked in a closest packing structure. Examples of the closest packing structure may include a hexagonal close-packing (HCP) structure and a face-centered cubic (FCC) structure.

In one embodiment, the macropores may be arranged in an opal structure and the carbon structure may have an inverse-opal structure. The shape of the macropores in such an opal structure enables easy adjustment of porosity, pore density and the like of the carbon structure.

For example, individual spherical macropores arranged in the opal structure, that is, the macropores, may not have the same shape of a regular size, or may not have a complete spherical shape. Accordingly, although a theological opal structure formed by stacking spherical macropores having the same size has a contact point between the respective macropores, the respective macropores of the carbon structure electrode for redox flow batteries may be interconnected to one another by forming surface contact with adjacent macropores. The macropores of such a shape can permit communication of an electrolyte from one side to the other side of the electrode.

The macropores may have an average maximum diameter from about 0.5 μm to about 500 μm. The macropores may be arranged in a pattern so as to have the above diameter range, whereby a surface area of an electrode per unit volume and flowability of the electrolyte can be adjusted.

The diameter of the macropores may be defined as a "diameter of an inscribed circle".

The carbon structure may have the porosity from about 70% to about 99%, specifically from about 80% to about 95%, due to the presence of the micropores. Higher porosity provides a higher surface area of the electrode and improves efficiency of the redox flow battery. However, if the porosity is less than about 70%, the internal pressure of the redox flow battery can be increased due to a small surface area of the electrode and poor flowability of the electrolyte between the macropores, thereby causing deterioration in overall battery efficiency upon pump driving of the battery. If the porosity is greater than about 99%, the carbon structure having the macropores is likely to be damaged due to fluid pressure of the electrolyte, thereby causing physical and electrical disconnection in the electrode and non-uniform dispersion of the electrolyte. Therefore, the carbon structure electrode for redox flow batteries preferably has the porosity from about 70% to about 99%, more preferably from about 80% to about 95%.

The carbon structure of the carbon structure electrode for redox flow batteries may include carbides of polymer resins. The preparation method thereof will be described in more detail below.

The carbon structure may at least partly include graphite as carbide. Namely, carbide may be partially or totally graphitized during preparation of the carbon structure, and thus the carbon structure may include partially graphite or may consist of a graphitized material.

The polymer resin may be patterned, and any polymer resins capable of being carbonized may be used without limitation. Examples of the polymer resin may include a polyacrylonitrile, a polymer for photoresist, a rayon based polymer, and the like. These may be used alone or in combination thereof.

Since the carbon structure electrode for redox flow batteries has a regular network between the carbons filling among the macropores and the macropores, the carbon structure electrode for redox flow batteries may have sufficient electrical conductivity to be used as a carbon structure electrode for redox flow batteries without an additional compression process.

As described above, the carbon structure exhibits excellent electrical resistance. For example, the carbon structure may have an electrical resistance from about 0.002 Ω·mm to about 0.02 Ω·mm The electrical resistance of the electrode refers to electrical resistance in a thickness direction of the redox flow battery. The thickness direction refers to a direction from the redox flow battery toward a separator. A longitudinal direction of the electrode refers to a direction in which the injecting and discharging electrolyte flows. The electrode may have an electrical resistance from about 0.002 Ω·mm to about 0.02 Ω·mm in the longitudinal direction thereof. In the electrode, the electrical resistance in the thickness direction may be substantially the same as the electrical resistance in the longitudinal direction.

The carbon structure may have a thickness from about 0.5 mm to about 5.0 mm When the thickness of the electrode is less than about 0.5 mm, the volume of the electrolyte passing through the electrode is small and fluid pressure increases, thereby causing loss in pump driving. Further, when the thickness of the electrode is greater than about 5.0 mm, connection with an electrolyte membrane is lowered due to low flowability of the electrolyte in the thickness direction of the electrode, thereby causing deterioration in battery efficiency.

The carbon structure electrode for redox flow batteries may be prepared by the method described in detail hereinafter.

Another embodiment of the present invention, a method of preparing a carbon structure electrode for redox flow batteries includes: preparing a polymer sheet; forming patterned macropores in the polymer sheet; and carbonizing the polymer sheet having the patterned macropores through heat treatment to form a carbon structure.

The carbon structure is comprised of carbide formed by carbonizing the polymer sheet.

Carbonization may be performed through the heat treatment of the polymer sheet having the patterned macropores. In the carbonization process, part of or the entire polymer sheet may be graphitized by increasing the heat treatment temperature. For example, the heat treatment may be performed at about 1000° C. to about 2000° C. in an inert gas atmosphere. In addition, when the polymer sheet is subjected to the heat treatment at about 2000° C. to about 2500° C. in an inert gas atmosphere, part of or the entire polymer sheet can be graphitized. The carbon structure may include graphite formed through graphitization. The graphite included in the carbon structure may have <002> lattice structure, as can be seen from X-ray diffraction (XRD) results, wherein the lattice plane spacing of the lattice structure may range from 3.35 to 3.90, and the lattice size in the c axis may range from 10 to 50, specifically from 15 to 30.

In order to form the macropores in the polymer sheet, the polymer sheet may be subjected to patterning using a laser.

For example, the polymer sheet may be patterned to form patterned macropores by a laser patterning method, a holographic lithography method using a laser, a laser lithography method, and the like. The patterning method is not limited thereto and these methods may be used in combination thereof.

The polymer sheet may have a sheet shape, a film shape, a block shape, and the like, and may have the thickness from about 0.5 mm to about 5 mm.

As the polymer sheet, any polymer materials capable of being patterned, carbonized and graphitized may be used without limitation. For example, the polymer sheet may be formed of one selected from the group consisting of a polyacrylonitrile, a polymer for photoresist, a rayon based polymer, and combinations thereof.

FIG. 1 is a schematic diagram illustrating a process of forming the patterned macropores in the method of preparing a carbon structure electrode for redox flow batteries according to one embodiment of the present invention.

FIG. 1 depicts the process of forming the patterned macropores by irradiating a polymer sheet 2 with a laser beam emitted from a laser source 1. FIG. 1a and FIG. 1b are a perspective view and a plan view, respectively, and FIG. 1c is an enlarged plan view of a patterned portion indicated in FIG. 1b.

Figure 2:
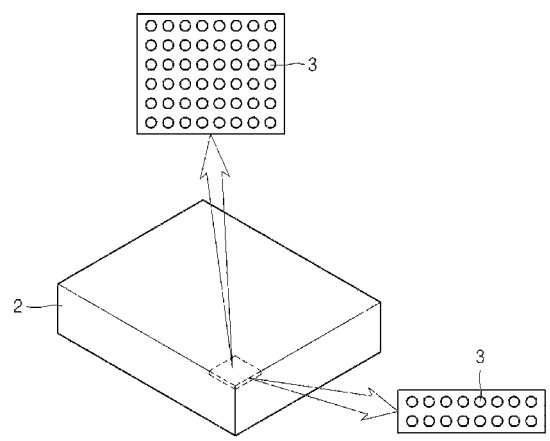
FIG. 2 is a schematic view of a carbon structure electrode for redox flow batteries according to another embodiment of the present invention, in which an upper surface and a side surface of the carbon structure electrode are partially enlarged.

FIG. 2 is a schematic view of the carbon structure electrode for redox flow batteries by the method according to one embodiment of the present invention, in which an upper surface and a side surface of the carbon structure electrode are partially enlarged.

The carbon structure electrode for redox flow batteries prepared by the method according to one embodiment of the present invention can exhibit excellent electrical conductivity without an additional compression process, as mentioned above. As such, the method of preparing a carbon structure electrode for redox flow batteries does not require an additional compression process, thereby simplifying the manufacturing process and reducing manufacturing costs.

Yet another embodiment of the present invention, a carbon structure electrode for redox flow batteries includes a bipolar plate, and a carbon structure electrode for redox flow batteries coupled to the bipolar plate.

The carbon structure electrode for redox flow batteries may be prepared by binding the bipolar plate to the carbon structure electrode for redox flow batteries.

Figure 3:
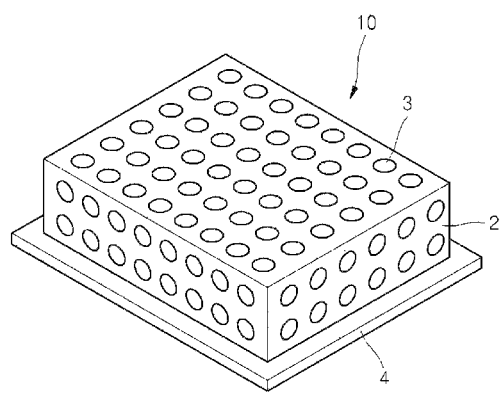
FIG. 3 is a schematic view of an electrode structure produced using a carbon structure electrode for redox flow batteries according to a further embodiment of the present invention.

FIG. 3 is a schematic view of the electrode structure produced using a carbon structure electrode for redox flow batteries according to a further embodiment of the present invention.

Next, the present invention will be described in more detail with reference to some examples. It should be understood that these examples are provided for illustration only and are not to be construed in any way as limiting the present invention.

Example 1

An epoxy based negative photoresist polymer sheet having the thickness of 0.5 mm was prepared and placed on a substrate. The polymer sheet was irradiated with a Nd:YVO$_4$ ($\lambda$=532 nm) laser beam divided into four beams, wherein the laser beam divided into the four beams has one central beam surrounded by three other beams, and the angle of the central beam to the three other beams was linearly changed to adjust the size and shape of macropores. At an angle of 40°, the polymer sheet was exposed to an overlapping interference beam for 5 seconds, washed with propylene glycol monomethyl ether acetate (PGMEA, Aldrich GmbH), and then dried in air. The three dimensional structure prepared in this way was heated to 1500° C. at a rate of 10° C./min under inert gas, followed by carbonization for 1 hour and then graphitization at 1900° C. for 30 minutes to prepare an electrode material.

Comparative Example 1

Graphite felt (GFD4.6, SGL carbon) was prepared as an electrode material.

Property Evaluation of Electrode

In order to measure resistance in the thickness direction of the electrode materials prepared in Example 1 and Comparative Example 1, electrodes having the same area were prepared. On both sides of each of the electrodes, a spacer formed of a copper plate was placed to adjust a thickness, followed by recording a resistance using a resistance meter connected to the copper plate. The resistance meter showed resistance in the thickness direction, represented by resistance per unit length. Results are shown in Table 1.

TABLE 1

| | Electrical resistance (Ω · mm) |
|---|---|
| Example 1 | 0.004 |
| Comparative Example 1 | 0.04 |

Referring to Table 1, it can be seen that the electrode material of Comparative Example 1 had a resistance of 0.04 Ω·mm and the electrode material of Example 1 had a resistance of about 0.004 Ω·mm Namely, it can be seen that the electrical resistance of the electrode material of Example 1 was about 1/10 times the electrical resistance of the electrode material of Comparative Example 1. From this result, it can also be seen that electrical conductivity of the electrode material of Example 1 was about ten times higher than that of the electrode material of Comparative Example 1.

Table 1 shows electrical resistance when the electrode materials of Example 1 and Comparative Example 1 were compressed in a rate of 0%. If the electrode material of Comparative Example 1 is compressed at a rate of about 20%, the electrical resistance can be lowered to about 0.008 Ω·mm If the electrode material of Comparative Example 1 is compressed at a rate of about 50%, the electrical resistance can be lowered to about 0.005 Ω·mm, namely, which is very similar to the electrical resistance of the electrode material of Example 1. However, Comparative Example 1 has a limitation in lowering the electrical resistance in that a compression process is indispensable to reduce electrical resistance of typical felt electrodes, namely, to improve electrical conductivity, and a compression rate of greater than about 50% corresponds to critical pressure or more, causing collapse of the electrode.

Although some embodiments have been described herein, it should be understood that various modifications, changes, alterations, and equivalent embodiments can be made by those skilled in the art without departing from the spirit and scope of the invention. Therefore, the scope of the invention should be limited only by the accompanying claims and equivalents thereof.

LIST OF REFERENCE NUMERALS

1: Laser source
2: Polymer sheet
3: Macropores
4: Bipolar plate
10: Electrode structure

What is claimed is:

1. A carbon structure electrode for redox flow batteries, comprising a plurality of spherical, patterned, uniformly dispersed, macropores formed on a surface of a polymer-derived carbon structure and inside the polymer-derived carbon structure so as to allow electrolyte migration,
wherein the macropores are arranged in an opal structure.

2. The carbon structure electrode for redox flow batteries according to claim 1, wherein the macropores have an average maximum diameter from 0.5 μm to 500 μm.

3. The carbon structure electrode for redox flow batteries according to claim 1, wherein the macropores are connected to one another to communicate from one side to the other side of the electrode.

4. The carbon structure electrode for redox flow batteries according to claim 1, wherein the carbon structure comprises a carbide of a polymer resin.

5. The carbon structure electrode for redox flow batteries according to claim 4, wherein the polymer resin comprises one selected from the group consisting of a polyacrylonitrile, a polymer for photoresist, a rayon-based polymer, and combinations thereof.

6. The carbon structure electrode for redox flow batteries according to claim 1, wherein the carbon structure comprises a graphitized material of a polymer resin.

7. The carbon structure electrode for redox flow batteries according to claim 1, wherein the carbon structure has a macropore-related porosity of 70% to 99%.

8. The carbon structure electrode for redox flow batteries according to claim 1, wherein the carbon structure has a thickness of 0.5 mm to 5.0 mm.

9. The carbon structure electrode for redox flow batteries according to claim 1, wherein the carbon structure has a resistance of 0.002 Ω·mm to 0.02 Ω·mm.

10. A carbon structure electrode structure for redox flow batteries, comprising:
a bipolar plate; and
the carbon structure electrode for redox flow batteries according to claim 1 coupled to the bipolar plate.

11. A method of preparing a carbon structure electrode for redox flow batteries, comprising:
preparing a polymer sheet;
forming patterned, uniformly dispersed macropores in the polymer sheet; and
carbonizing the polymer sheet having the patterned macropores by heat treatment to form a carbon structure.

12. The method according to claim 11, wherein the step of forming the patterned macropores is performed by at least one selected from a laser patterning method, a holographic lithography method using a laser, and a laser lithography method.

13. The method according to claim 11, wherein at least part of the polymer sheet is graphitized upon carbonization through heat treatment of the polymer sheet.

14. The method according to claim 11, wherein the polymer sheet comprises one selected from a polyacrylonitrile, a polymer for photoresist, a rayon based polymer, and for photoresistcombinations thereof.

15. The method according to claim 11, wherein the heat treatment is performed at 1000° C. to 2500° C.

* * * * *